Figure 1:
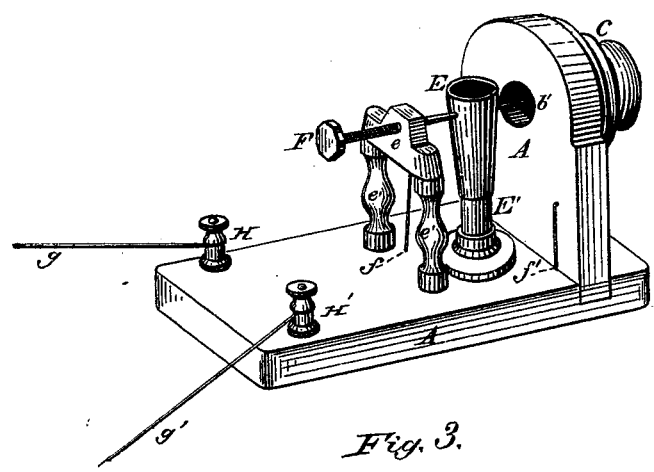

2 Sheets—Sheet 1.

G. B. RICHMOND.
Speaking-Telephone Transmitter.

No. 202,870. Patented April 23, 1878.

Attest:
L. W. Seely.
R. N. Dyer.

Inventor:
George B. Richmond
by Geo. W. Dyer & Co.
atty

N. PETERS, PHOTO-LITHOGRAPHER, WASHINGTON, D. C.

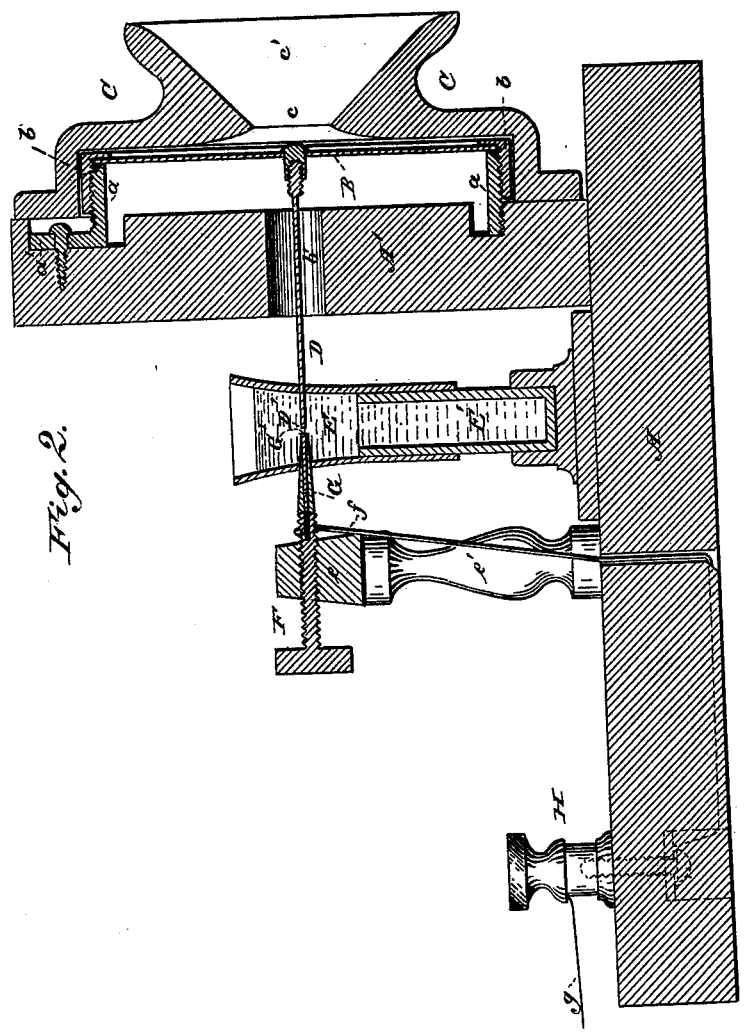

UNITED STATES PATENT OFFICE.

GEORGE B. RICHMOND, OF LANSING, MICHIGAN.

IMPROVEMENT IN SPEAKING-TELEPHONE TRANSMITTERS.

Specification forming part of Letters Patent No. 202,870, dated April 23, 1878; application filed January 19, 1878.

*To all whom it may concern:*

Be it known that I, GEORGE B. RICHMOND, of Lansing, in the county of Ingham and State of Michigan, have invented a new and useful Improvement in Telephones; and I do hereby declare that the following is a full and exact description of the same, reference being had to the accompanying drawings, and to the letters of reference marked thereon.

The object I have in view is an improvement upon hydro-electric telephones, whereby I produce an instrument which will transmit the electrical vibrations over long distances with greater certainty, giving a free escape to the gases that are generated between the platinum points by the decomposition of the water, and thereby lessening the resistance to the passage of the current of electricity and making such resistance more uniform, and at the same time the parts of the instrument will be more compactly arranged, and also simpler in construction.

This application relates to an improvement in my hydro-electric telephone-transmitter described in an application filed by me August 24, 1877, in which I have shown a diaphragm secured to the end of a tube, and carrying a metallic point dipping into water, and arranged opposite to another point projecting upward from the bottom of the water-holding tube, the parts being arranged in the circuit of a battery and line, so that the vibrations of the diaphragm and attached point, when set in motion by air-waves, act to increase and diminish the resistance of the circuit according to the volume of water interposed between the points, thereby producing electrical undulations in the line. In that apparatus the points are placed in a vertical position.

My invention therein consists, first, in placing the platinum points in a horizontal, instead of vertical, position in a water-tube, and in arranging the diaphragm vertically, whereby the gases generated between the platinum points are allowed to escape, as before explained, and the instrument is made more compact; second, in constructing the water-holding tube of flexible material, with an open top, so that the platinum points can be passed water-tight through the sides of the same, the sides of the tube being adapted to move with the vibrations of the diaphragm; third, in supporting such flexible water-holding tube on the top of a vertical glass tube secured to the frame-work; fourth, in the combination of the flexible water-tube and the platinum points passed through the walls of the same, on opposite sides thereof and in line with the center of the diaphragm; and, fifth, in the construction of the frame for the telephone, all as fully hereinafter explained.

To enable others skilled in the art to manufacture and use my improved telephone, I proceed to describe the same, having reference to the drawings, in which—

Figure 1 is a perspective view of the instrument from the rear; Fig. 2, a central longitudinal section of the full-sized instrument, and Fig. 3 a separate view of the diaphragm and the devices for securing the same in its supporting-frame.

Like letters denote corresponding parts.

Figure 3:
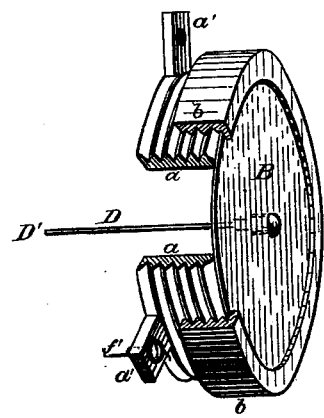

A represents the flat wooden base of the instrument, which may be made of any desired shape, and A' is a vertical wing or standard rising from such base near one end thereof. The top of this standard is preferably rounded, as shown. B is a metallic diaphragm, made preferably of thin soft-iron plate, which is supported against the end of an annular metallic frame, *a*, by a ring, *b*. The annular frame *a* has an exterior screw-thread, and the ring *b* is provided with an interior screw-thread and an inwardly-projecting flange, so that by screwing these two parts together the diaphragm can be securely held between them, as shown in Figs. 2 and 3. The frame *a* is provided with short arms *a'*, by which such frame and the ring and diaphragm attached thereto are supported in a vertical position on the outside of the standard A'. These parts are covered and protected by a circular wooden cap, C, which is secured to the standard A', and has a small central opening, *c*, and a funnel-shaped mouth-piece, *c'*, through which the sound passes which vibrates the diaphragm. As a modification of the manner of supporting the diaphragm, I have designed to do away with the frame *a* and ring *b*, and to secure the diaphragm directly against the face of the standard A' by the same screws that hold the cap C to the standard, such cap and standard being recessed away from the diaphragm at a short distance within its periphery, so as to allow such diaphragm to vibrate freely. Back of the center of the diaphragm a hole, $b'$, is made in the standard A', and to the center of the diaphragm is secured, by any suitable means, a piece of platinum wire, D, which projects horizontally through such standard and through the side of the vertical water-tube E. This water-tube is made preferably of flexible india-rubber, but may be constructed of any other flexible non-conducting material, and has an open top. The water-tube is supported upon a glass tube, E', which is firmly secured upon the base immediately to the rear of the standard A', and has an open upper end and solid glass bottom. The flexible tube is secured, water-tight, to the glass tube by stretching the lower end of the flexible tube over the upper end of the glass tube. The wire D is passed through a very small hole made in one side of the flexible tube, so that the walls of the tube spring against the wire and form a water-tight connection; and this wire extends part-way across the interior of the water-tube, its end or point D' terminating at any desired distance from either side of the tube.

F is a horizontal screw, which turns in a block, $e$, of hard rubber or other non-conducting substance, supported upon small standards $e'$, rising from the base just to the rear of the water-tube. This screw is on a direct line with the wire D and the center of the diaphragm, and has attached to its end a short piece of platinum wire, G. The sides of this wire G are covered by a layer of rubber or other non-conductor, such as glass, leaving only the extreme end or point G' exposed. This wire, with its non-conducting covering, is passed through the side of the flexible water-tube opposite to the point D', and the two points D' G' are brought near to each other by turning the screw F, so that the distance between the points will be only about one sixty-fourth ($\frac{1}{64}$) of an inch. A wire, $f$, is attached to the screw F, and passes through the base and along the under side of the same to the post H. Another wire, $f'$, is connected to the frame $a$, in which the diaphragm is supported, and to the lower end of a post, H', on the base. From the post H a wire, $g$, runs to the line, and a wire, $g'$, extends from the post H' to a battery. The tubes E E' being filled with pure or distilled water, so as to cover the points D' G', and my instrument, which is a transmitter, being put into connection with the battery and line, the current of electricity passes from the battery through the wires $g' f'$, frame $a$, diaphragm, and wire D to point D', then through the water to point G', wire G, screw F, wires $f g$, and onto the line. The sound enters the opening $c$ and causes the diaphragm to vibrate in unison with the sound-waves, thereby alternately increasing and diminishing the amount of water between the platinum points, which causes an undulatory movement in the current of electricity.

The advantages of the peculiar construction and arrangement of the parts of my transmitter are as follows: By placing the platinum points in a horizontal position and making the water-tube with an open upper end, the gases generated around these points by the action of the electricity upon the water, which has a tendency to partially decompose the water, are allowed to escape vertically into the atmosphere, as well as all gases which are formed by the decomposition of the material of which the tube is composed. This arrangement also does away with the necessity of any adjusting devices to move the water-tube. The placing of the diaphragm in a vertical position in connection with the horizontal arrangement of the platinum points, allows the instrument to be put into a more compact form. By constructing that portion of the water-tube through which the points pass of flexible material, the horizontal position of the points can be retained with an equal freedom of movement. If this tube were made solid, the motion of the wire D through the side of the same would be impeded, since the opening would have to be packed to secure a water-tight joint, and this would cause too much friction to permit of the perfect working of the instrument. The mounting of the flexible tube upon a glass tube with a solid bottom entirely insulates the water from the base, and forms a rigid support for the flexible tube. The construction of the platinum wire G with a non-conducting covering prevents the force of the current of electricity from passing off as easily as would be the case if more than the sectional area of the wire were surrounded by the water. The supporting of the point G' upon the end of the screw F allows such point to be properly adjusted. The means for holding the diaphragm in its frame are simple and effective.

Having thus fully described my instrument, what I claim as new therein, and desire to secure by Letters Patent, is—

1. In a hydro-electric telephone, the combination, with the vertical diaphragm, of the horizontal platinum points and the water-tube, substantially as and for the purposes set forth.

2. In a hydro-electric telephone, the flexible water-tube, substantially as and for the purposes set forth.

3. In a hydro-electric telephone, the combination, with the flexible water-tube E, of the rigid tube E', upon which the flexible tube is mounted, substantially as described and shown.

4. The combination, with the diaphragm, of the flexible water-tube and the platinum points passed through the walls of the flexible tube on opposite sides thereof, and in line with the center of the diaphragm, substantially as described and shown.

5. The frame for a telephone, consisting of the base A, standard A', and cap C, constructed and arranged substantially as described and shown.

This specification signed and witnessed this 26th day of December, 1877.

GEORGE B. RICHMOND.

Witnesses:
 ALFRED BEAMER,
 B. G. CORYELL.